United States Patent
Taylor

(10) Patent No.: US 6,273,008 B1
(45) Date of Patent: Aug. 14, 2001

(54) CHLORINATED HYDROCARBON WASTE INCINERATOR AND VALORIZATION OF CHLORINATED RESIDUALS PROCESS UNIT

(76) Inventor: Tommy G. Taylor, 4011 Creole St., Lake Charles, LA (US) 70605

( * ) Notice: Subject to any disclaimer, the term of this patent is extended or adjusted under 35 U.S.C. 154(b) by 0 days.

(21) Appl. No.: 09/193,000

(22) Filed: Nov. 16, 1998

Related U.S. Application Data

(60) Provisional application No. 60/080,458, filed on Apr. 2, 1998.

(51) Int. Cl.[7] .............................. F23J 15/00; C01B 7/00
(52) U.S. Cl. ...................... 110/345; 110/238; 110/342; 110/348; 110/204; 423/240 R
(58) Field of Search ................................ 110/278, 342, 110/343, 344, 345, 346, 348, 204, 205; 423/240 R

(56) References Cited

U.S. PATENT DOCUMENTS

| | | | |
|---|---|---|---|
| 4,039,623 | * | 8/1977 | Lavanish ............................ 423/240 |
| 4,045,538 | * | 8/1977 | Sare et al. .......................... 423/240 |
| 4,157,374 | * | 6/1979 | Carpenter et al. ................. 423/210 |
| 4,206,188 | * | 6/1980 | Megerle .............................. 423/245 |
| 4,209,496 | * | 6/1980 | Carpenter et al. ................. 423/210 |
| 4,430,046 | * | 2/1984 | Cirrito .................................. 417/55 |
| 5,309,850 | * | 5/1994 | Downs et al. ..................... 110/235 |
| 5,697,307 | * | 12/1997 | Nelson et al. ..................... 110/345 |
| 5,954,937 | * | 9/1999 | Farmer ............................... 205/687 |

* cited by examiner

Primary Examiner—Denise L. Ferensic
Assistant Examiner—K. Rinehart
(74) Attorney, Agent, or Firm—Dominqué& Waddell

(57) ABSTRACT

A closed-loop process for incinerating chlorinated hydrocarbon-containing material without the emission of air borne pollutants. The chlorinated hydrocarbon-containing material is incinerated, preferably in the substantial absence of air, thereby producing a gaseous effluent containing hydrogen chloride and pollutants such as carbon dioxide, acid gases, and halogenated compounds. The gaseous effluent is passed through a hydrogen chloride purification system to remove hydrogen chloride from the gaseous effluent and to produce a concentrated anhydrous hydrogen chloride gaseous stream. The gaseous effluent is passed through at least one sorbent bed, such as a bed of activated carbon, to remove halogenated pollutants from the effluent. The pollutants are desorbed from the one or more sorbent beds and recycled to the incinerator where they are decomposed by combustion.

10 Claims, 12 Drawing Sheets

$$CH \equiv CH + HCl \longrightarrow CH_2 = CHCl$$
ACETYLENE  ANHYDROUS        VINYL CHLORIDE
           HYDROGEN          MONOMER
           CHLORIDE $$2CH_2 = CH_2 + Cl_2 + 1/2\ O_2 \longrightarrow 2\ CH_2 = CHCl + H_2O$$
ETYLENE   CHLORIDE  OXYGEN            VINYL  CHLORIDE  WATER

CHLORINATED HYDROCARBON WASTE INCINERATOR AND VALORIZATION OF CHLORINATED RESIDUALS PROCESS UNIT

REFERENCE TO RELATED APPLICATION

This application claims the priority of the provisional patent application No. 60/080,458 entitled "Method for Modifying Chlorinated Hydrocarbon Waste Incinerator and Valorization of Chlorinated Residuals Process Unit" filed Apr. 2, 1998.

TECHNICAL FIELD

The present invention relates to an improved method for treating chlorinated hydrocarbons in valorization of chlorinated residuals (VCR) process unit (see, e.g., U.K. Pat. No. GB 2053452) and the chlorinated hydrocarbon waste incinerator, and more particularly to a method for modifying these systems such that a synthesized blend of carbon dioxide and oxygen replaces the ordinary air used to fuel the reaction in either system, thereby generating a useful hydrogen chloride product and a useful carbon dioxide product in both the VCR process unit and the chlorinated hydrocarbon waste incinerator. The invention further encompasses modifications to the anhydrous hydrogen chloride purification unit attached to these systems that prevent the discharge of any hydrochloric acid streams containing three (3%) percent by weight or greater hydrogen chloride dissolved in water. Furthermore, the invention encompasses the addition of absorbent beds to these systems that remove contaminants from the carbon dioxide product, with these contaminants ultimately being recycled back into the high temperature reactors, where they are converted to hydrogen chloride and carbon dioxide. Also, the invention encompasses the addition of a unit whereby oxygen that is present in the carbon dioxide exiting the absorbent beds is separated from the final carbon dioxide product stream and then recycled back into the high temperature reactor.

BACKGROUND OF THE INVENTION

Chlorinated hydrocarbon by-product materials are generated in a wide variety of chlorinated hydrocarbon manufacturing operations, such as the manufacture of ethylene dichloride, vinyl chloride monomer, methyl chloroform, trichloroethylene, perchloroethylene, allyl chloride or mono and dichlorobenzene. These are all commercial products, some of which may be used as solvents, others as feedstocks for producing materials such as non-ozone depleting refrigerants, plastic film (Saran Wrap®), polyvinyl chloride, Teflon®, or Kynar®. The chlorinated hydrocarbon by-products of these manufacturing operations have been traditionally considered hazardous wastes requiring carefully regulated treatment. One common method for treating these hazardous by-products is to destroy them in a chlorinated hydrocarbon waste incinerator. In such systems, the liquid wastes are injected into a natural-gas fired incinerator, where the chlorinated organic molecules are essentially oxidized, thus yielding hydrogen chloride (HCl), salt water and a vent gas comprised mostly of nitrogen and carbon dioxide. An example of this type of system is depicted in FIG. 1.

Steam, or perhaps water, that is sometimes used to cool the reaction in these incinerators mixes with the hydrogen chloride, thus yielding a weaker hydrochloric acid by-product solution. This hydrochloric acid by-product, from four to twenty (4% to 20%) percent by weight hydrogen chloride, is too weak for typical commercial uses, which generally require acid strengths in excess of thirty-one (31%) percent by weight hydrogen chloride. Therefore, the useless hydrochloric acid by-product must be neutralized and disposed of as salt-water waste. Under federal guidelines, any unit producing an acid stream greater than three (3%) percent by weight hydrogen chloride must be classed as a halogen acid furnace (HAF) under the General Hazardous Waste Rules. This weak acid stream is therefore considered an undesirable waste product. Furthermore, the pre-dominately nitrogen/carbon dioxide waste gas generated in these incinerators is simply vented into the atmosphere. Some of the components present in the incinerator may also be converted into extremely toxic dioxin and into nitrous oxide, which may then appear in the vent gases. The fact that all by-products of the typical chlorinated hydrocarbon incineration unit are un-useful, undesirable waste materials represents a disadvantage to this system.

The valorization of chlorinated residuals (VCR) process unit, similar to the incinerator described above, was designed specifically to produce at least one useful by-product of the typical chlorinated hydrocarbon oxidation technique that takes place in an incinerator, namely anhydrous hydrogen chloride, although, of course the principles of the invention are applicable to other types of processes as well, including new facilities which are designed from the beginning to use the principles of the present invention. However, for exemplary purposes, the invention will be primarily discussed with respect to the particular BCP VCR facility described more fully below.

The VCR process unit, as employed by Borden Chemicals and Plastics (BCP) at Geismar, LA, converts the chlorinated hydrocarbon by-product left over from the manufacture of vinyl chloride monomer into useful hydrogen chloride. One method for producing vinyl chloride monomer (VCM) entails reacting acetylene and anhydrous hydrogen chloride (HCl) as the raw materials for manufacturing the VCM product (see FIG. 2). This process, as practiced by BCP, is termed the VCM-A Process. Another method for producing VCM entails reacting chlorine or anhydrous HCl and ethylene to produce ethylene dichloride or 1,2 dichloroethane (EDC). The EDC is then thermally reacted to produce VCM (see FIG. 3). This process, as practiced by BCP, is termed the VCM-E Process. In both VCM processes, the chlorinated hydrocarbon by-product, also called organic intermediate materials, is generated. These organic intermediate materials consist primarily of the following chemical components:

ethylene dichloride ($CH_2ClCH_2Cl$), trichloroethane ($CHCl_2CH_2Cl$), 1,1,2,2 tetrachloroethane ($CHCl_2CHCl_2$), 1,1,1,2 tetrachloroethane ($CHCl_3CH_2Cl$), and pentachloroethane ($CHCl_2CCl_3$)

Compounds such as chloroprene, 1,1 dichloroethane, 1,1,1 trichloroethane, chloroform, carbon tetrachloride, cis/trans-dichloroethylene, trichloroethylene, perchloroethylene and various other chlorinated organic compounds are also possible intermediate materials. These organic intermediate materials are further used as feedstock in the VCR process unit, whereby anhydrous HCl is manufactured for use as a raw material feedstock for the VCM-A process described above. The VCR process unit therefore serves as an HCl manufacturing unit using as feedstock the organic intermediate materials produced in the VCM-A and VCM-E processes, the intention being to maintain a "closed-loop" manufacturing process whereby all intermediate materials are usefully and beneficially utilized.

Thus, the VCR process unit is designed specifically to use the organic intermediate by-product of both VCM processes as a feedstock for manufacturing HCl, a necessary raw material in the VCM-A and VCM-E processes. The reaction taking place in the VCR process unit is depicted in FIG. 4. The system itself is depicted in FIG. 5.

The VCR process unit uses two raw materials for manufacturing HCl, namely the organic feedstock and air. These raw materials are mixed in the VCR reactor, which contains a proprietary mixing device in which HCl is initially manufactured. In this mixing device, vaporized liquid feedstock is introduced into a high velocity, high temperature air stream. The feedstock and the air react to form anhydrous HCl. The type of reactions that occur in the VCR process are represented by the following equation:

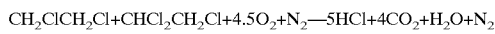

$$CH_2ClCH_2Cl + CHCl_2CH_2Cl + 4.5O_2 + N_2 \rightarrow 5HCl + 4CO_2 + H_2O + N_2$$

From the VCR reactor, the anhydrous HCl is directed into a purification unit and then used as feedstock in the VCM-A process. Excess water generated in the reactor must be purged from the system via this HCl purification unit. Since this purge water contains greater than three (3%) percent by weight hydrogen chloride, thus constituting a weak acid stream, the VCR process unit is also classed as a halogen acid furnace. This weak acid purge must be neutralized to form salt water, which may then be sewered.

Meanwhile, a gaseous by-product, comprised mainly of $CO_2$, $N_2$, and minimal amounts of $O_2$, HCl and $Cl_2$, is directed into an alkaline-fed scrubbing unit, where any HCl and chlorine molecules are converted into salt water and then disposed of. Remaining gases, comprised mainly of $CO_2$, $N_2$ and minimal amounts of $O_2$, are vented to the atmosphere.

The VCR process unit attempts to achieve "closed system" status for the VCM manufacturing process by converting the chlorinated organic material into reusable HCl. The remaining by-products, such as the salt water created from the neutralization of the weak acid purge from the HCl purification unit or from the alkaline-fed scrubbing unit, or the gaseous vent emissions comprised of $CO_2$, $N_2$, $O_2$ have been historically considered environmentally harmless and thus suitable for release into the environment. However, recent concern about global warming and the need to reduce emissions of $CO_2$, a greenhouse-effect gas, has prompted the U.S. EPA to look with scrutiny on chemical processes that needlessly vent $CO_2$ to the atmosphere.

Furthermore, the weak acid purge from the HCl neutralization unit is an undesirable waste product, as is the possible presence of dioxins inadvertently generated in the reactor that may appear in the vent gases.

A need exists, therefore, to modify the existing VCR process and the typical chlorinated hydrocarbon waste incinerator such that no $CO_2$ is emitted to the atmosphere in the vent gas emissions from either system. The U.S. EPA, in carrying out the intentions and objectives of the Resource Conservation and Recovery Act (RCRA), has incorporated into the RCRA regulations certain rules and procedures to encourage chemical manufacturers to exploit as feedstocks for producing useful chemical products those intermediate materials that otherwise would be classified as hazardous waste materials. The EPA's ultimate goal is to achieve near one-hundred (100%) percent conversion of such intermediate materials into useful chemical products. This goal can be achieved by modifying existing chlorinated hydrocarbon waste incinerators and VCR process units such that no $CO_2$ is emitted to the atmosphere because of the unnecessary introduction of $N_2$ into the incinerator or the VCR. With no $N_2$ being introduced into either system, the vent from both systems becomes reasonably pure, marketable $CO_2$, thus enabling essentially one-hundred (100%) percent beneficial utilization of the chlorinated organic intermediates.

A need also exists to modify the anhydrous HCl purification unit attached to the VCR process unit such that the weak acid stream purged from the system contains three (3%) percent or less by weight hydrogen chloride. These modifications to the HCl purification unit are also applicable to those HCl purification units (herein termed "primary scrubbers") associated with chlorinated hydrocarbon waste incinerators.

A need further exists to modify the final gas vents in the VCR process unit and the chlorinated hydrocarbon waste incinerator such that undesirable compounds such as dioxins that might be present in the vent gases are captured before release to the atmosphere and destroyed within the system.

SUMMARY DISCUSSION OF THE INVENTION

The present invention is designed in one of its major aspects specifically to eliminate the $N_2$ component of the final emission from, for example, the chlorinated hydrocarbon waste incinerator shown in FIG. 1 and, for further example, from the VCR process unit shown in FIGS. 4 and 5. The present invention is also designed to eliminate, for example, an acid purge greater than three (3%) by weight hydrogen chloride from the anhydrous HCl purification units attached to both systems. Furthermore, the present invention is designed inter alia to eliminate, for still further example, any trace contaminants, such as dioxin, from the vent gases of either system.

It is noted that oxygen ($O_2$) is the only component of air that is needed to react with the chlorinated organic materials in both systems in order either to destroy the molecules in the incinerator, or to manufacture anhydrous HCl in the VCR process unit. Nitrogen ($N_2$), an inert gas comprising roughly seventy-eight (78%) percent of air, acts as a necessary diluent and coolant in the mixture that is fed into the incinerator and the VCR reactor. The $O_2$ component of the reaction taking place in either system preferably must not greatly exceed the normal twenty-one (21%) percent volume found in air, lest the reaction go unchecked and temperatures within the incinerator or the VCR reactor exceed specifications. After the reaction, the $N_2$ component, in the preferred embodiment, simply passes through the system, released in the final emissions stage as an inert, useless vent component, mixed predominately with carbon dioxide ($CO_2$), another inert gas. Since $CO_2$ is an identified greenhouse-effect gas, and since the separation and purification of $N_2$ and $CO_2$ in this vent stream would be a very expensive and an inefficient operation, the $N_2/CO_2$ vent stream is undesirable.

However, the inventor has surmised that a synthesized mixture of roughly twenty-one (21%) percent by volume $O_2$ and seventy-nine (79%) percent by volume $CO_2$ could be used in place of air in both the chlorinated hydrocarbon waste incinerator and the VCR reactor, thereby eliminating the undesirable $N_2$ from the vent stream. This synthesized gas mixture could contain as much as ninety (90%) percent by volume $CO_2$ and ten (10%) percent by volume $O_2$, or as little as twenty-five (25%) percent by volume $CO_2$ and seventy-five (75%) percent by volume $O_2$. However, the optimum mixture would likely contain from about sixty (60%) percent to about eighty (80%) percent by volume $CO_2$, with forty to twenty (40% to 20%) percent by volume $O_2$ comprising the remaining percentage.

$CO_2$, an inert gas, could essentially replace the diluent $N_2$ in the feed air, thus providing the same diluent and non-reacting properties of the $N_2$. The $O_2$ in this mixture, essentially the same amount by volume as found in air, would effectively carry out the reaction with the chlorinated organic intermediates necessary to break down these chlorinated molecules, as in the incinerator, or to produce anhydrous HCl, as in the VCR reactor. The by-products of the reaction would therefore be comprised essentially of $CO_2$ and a small amount of $O_2$. Trace amounts of $Cl_2$ and HCl in these emissions would still be eliminated in the alkaline scrubbing unit attached to either system, thereby producing a harmless salt water by-product. Other unwanted trace compounds, such as dioxin, can be eliminated from the vent gases through modifications that are described below. The remaining vent gas emission would therefore be predominately $CO_2$ and a small amount of $O_2$. In this way, no undesirable $N_2$ would enter or leave the incinerator or the VCR process unit. The reaction employing a $CO_2/O_2$ mixture in place of air in the VCR process unit is shown in FIG. 6. The modified system using only the $CO_2/O_2$ mixture is depicted in FIG. 7. The modified waste incinerator is depicted in FIG. 8.

A further advantage exists in using $CO_2$ as a diluent in the gaseous raw material fed into the VCR process unit and into the chlorinated hydrocarbon waste incinerator. Since $CO_2$ is a necessary inert component to this raw material, the $CO_2$ that comprises the final emission from either system could then be reclaimed and reused to mix with $O_2$ as the diluent in the gaseous raw material. In this way, the VCR process unit genuinely becomes a "closed-system." wherein all end-products of the VCM and VCR processes are reused in the system.

No undesirable gases would therefore be released into the atmosphere. Excess $CO_2$ generated as a result of the VCR process or the chlorinated hydrocarbon waste incinerator could further be used in any number of useful applications.

The modified chlorinated hydrocarbon waste incinerator, using only the synthesized $CO_2/O_2$ mixture, becomes a much improved, much more useful waste treatment system, since no undesirable greenhouse-effect exit gases are vented from the system, nor may undesirable by-products, such as nitrous oxide and dioxin be created and vented to the atmosphere. Instead, as in the VCR process unit, the $CO_2/O_2$ vent gas mixture may be reclaimed and recycled back into the incinerator, or the $CO_2$ may be used in other processes. Since this $CO_2/O_2$ mixture could also be used in place of water to cool the reaction in the incinerator, the hydrogen chloride by-product generated in the incinerator would be less diluted, and thus more economically processable to anhydrous hydrogen chloride or strong commercial hydrochloric acid.

The VCR process unit contains an HCl purification unit, an example of which is depicted in FIGS. 4 and 5. The purpose of this unit is to separate the $CO_2$, $N_2$ and $O_2$ from the HCl and also to separate the HCl from the water, thus producing useful anhydrous hydrogen chloride product. However, the present VCR art practiced for example by BCP does not process all of the HCl produced in the VCR reactor into high purity anhydrous HCl. A small amount of weak hydrochloric acid, eighteen to twenty (18% to 20%) percent by weight hydrogen chloride, is produced and removed from the system to serve as the outlet for the water that is produced in the VCR reactor (see FIG. 9), and which must be purged from the system. Because of the production of this weak acid purge stream, BCP's VCR operation has been further classified by the EPA as a halogen acid furnace (HAF) under the General Hazardous Waste Rules.

FIG. 10 represents a proposed modification to the VCR HCl purification scheme that eliminates the production of the halogen acid stream, thus achieving nearly one-hundred (100%) percent production of high purity anhydrous HCl gas from the HCl that is manufactured in the VCR reactor. Without the production of a halogen acid stream containing three (3%) percent or more of HCl, the VCR unit does not meet the specified criteria for a halogen acid furnace.

The modification to the VCR HCl purification system requires the addition of a distillation column to be used for the purpose of stripping water from a hydrochloric acid solution containing from fourteen and a half to nineteen (14.5% to 19%) percent by weight HCl. Such a stream can be produced by operating the HCl stripper at an elevated pressure. An operating pressure of one-hundred and ten (110) PSIG will permit the production of an underflow stream from the HCl stripper containing as little as fourteen and a half (14.5%) percent by weight HCl. The inventor suggests operating the HCl stripper at such a pressure as will produce an eighteen (18%) percent by weight HCl underflow stream.

The inventor further suggests operating the water stripping column at pressures ranging from zero to near full vacuum. At a pressure of zero PSIG, the underflow from the water stripping column should be approximately twenty and two-tenths (20.2%) percent by weight HCl dissolved in water. The overhead from the water stripping column could be controlled to produce a water stream containing very little HCl, definitely less than three (3%) percent by weight HCl.

The amount of water discharged from the top of the water stripping column will be determined by the amount of water produced in the VCR reactor. It is the opinion of the inventor that feeding into the water stripping column a stream containing eighteen (18%) percent HCl and withdrawing an underflow stream from that column containing twenty (20%) percent HCl will normally permit the removal of the needed amount of water from the system. If more water removal is required, the operating pressure of the HCl column can be increased, thus lowering the HCl content of the underflow from that column. Another option would be to recycle a portion of the underflow from the water stripping column back into the HCl stripping column as a mid-column feed stream.

The technique described herein for removing water from a VCR process unit is applicable to situations where conventional chlorinated hydrocarbon waste incinerators are employed to manufacture high purity anhydrous HCl from chlorinated hydrocarbon waste materials.

Even when feeding a synthesized mixture of $CO_2$ and $O_2$, instead of air, into VCR units or into conventional hazardous waste incinerators, there is still the possibility that minute amounts of undesirable compounds generated in the reactor, such as dioxin, will appear in the $CO_2$ product stream. The inventor further proposes that absorbent beds capable of absorbing such components as dioxins be incorporated into the vent systems of the VCR process unit and the conventional chlorinated hydrocarbon waste incinerator systems to remove any trace quantities of such components that might be present in the $CO_2$ product stream.

After leaving the HCl purification unit, this $CO_2$ product stream preferably would be blown through a bed of absorbent material, such as activated carbon for example, or any number of suitable materials that readily absorb compounds such as dioxin. Said contaminants in the gas would be trapped within this absorbent material. Furthermore, the bottom portion of each absorbent bed can include some desiccant material capable of removing small amounts of water that otherwise would be present in the $CO_2$ stream exiting the bed. Clean, dry $CO_2$ containing some amount of $O_2$ would exit the downstream end of the bed. In time, the absorbent materials would become saturated with said contaminants and would thus require reactivation, which could be accomplished by pumping a hot reactivation gas through the bed to release the contaminants.

Since $CO_2$ in this invention preferably is being recycled to produce a synthesized $CO_2/O_2$ stream for feeding into VCR reactors or into hazardous waste incinerators, the inventor proposes reactivating the absorbent bed with some of the $CO_2$ product that has been super-heated by steam. This reactivation gas would then be passed through the spent bed to strip out dioxin or other such contaminants, and then the gas would be routed back into the high temperature incinerator or VCR reactor where said contaminants would be oxidized, and essentially destroyed. In this way no contaminants would ever leave the VCR process unit or the chlorinated hydrocarbon waste incinerator.

FIG. 11 depicts two absorbent beds installed in parallel that can be used to clean the $CO_2$ product, while at the same time preventing in total the escape to the environment of any toxic compounds such as dioxins that might be present in gases exiting a VCR reactor or a hazardous waste incinerator. The optimal design of such a system would employ at least two absorbent beds in parallel so that one bed could be cleaning the $CO_2$ product while the other bed is in reactivation service.

Additionally, it is anticipated that these two modified systems for processing chlorinated hydrocarbons can be located near or adjacent to facilities utilizing $CO_2$ as feedstock, such as plants manufacturing urea, a vital component in fertilizer, or plants that manufacture methanol, or plants for producing silicon dioxide pigment, or other such $CO_2$ consuming operations.

Excess $CO_2$ generated in either system might also be purified and used for such things as inert purging and padding gas for systems handling, for example, flammable materials and for producing carbonated beverages. Thus, finally, as an optional, supplemental process, a sub-system for separating out undesired oxygen ($O_2$) from the product carbon dioxide ($CO_2$) stream for optional use in conjunction with the HCl purification system of the invention is provided.

A further aspect of the present invention includes using a unit whereby the $CO_2$, which contains some amount of $O_2$, exiting the absorbent beds is compressed to a relatively high pressure and then passed through, for example, the tubes of a shell-and-tube, heat exchanger, which has on the shell side of the exchanger liquid $CO_2$ boiling at a lower pressure. The cold boiling $CO_2$ on the shell side of the heat exchanger condenses the high pressure $CO_2$ passing through the tubes, thus producing a stream containing liquid $CO_2$, $O_2$ in solution with the liquid $CO_2$, and free $O_2$ gas. This stream is fed into a column where, for example, hot compressor discharge gas is used to apply heat to the liquid $CO_2$ at the bottom of the column, thus driving the dissolved $O_2$ up and out the top of the column. The $O_2$ rich stream exiting the top of the oxygen stripping column can be recycled back into the high temperature reactor, e.g. the incinerator. The vaporized oxygen free $CO_2$ stream, as it exits the shell side of the heat exchanger is heated with, for example, hot compressor discharge gas, thus producing heated, high quality pipeline $CO_2$ product. Since this $CO_2$ product stream contains essentially no $O_2$, it can be used, for example, as a reactivation gas for absorbent beds utilizing activated carbon as the absorbent material.

Also included in this invention is a simplified, integrated process and system for converting chlorinated hydrocarbon by-products into useful anhydrous HCl gaseous products and useful $CO_2$ gaseous product with zero discharge of anything to the environment, in a process that completely meets the objectives of the Resource Conservation and Recovery Act (RCRA). This can be done using a method and system for modifying conventional hazardous waste, incinerator units or VCR units for producing high purity HCl gas and high purity $CO_2$ gas with zero discharge of any materials to the environment. The present invention also includes a method and system for building and operating new (vis-a-vis modifying conventional) incinerator units and new VCR units that will produce from chlorinated by-products high purity HCl and high purity $CO_2$ with zero discharge of any material to the environment.

It is further noted, with respect to some of the foregoing, that the present invention includes inter alia:

1. Modifications that can be made to the VCR process, which is now a process used for the purpose of destructing chlorinated hydrocarbon materials that have been classified by the EPA as hazardous waste materials, such that these materials would no longer be classified as hazardous waste materials because:

a) The materials would be used in total to produce feedstocks that would be further used to produce other marketable products. The production of water and a very miner amounts of salt is acceptable. The key is to convert essentially all the carbon, chloride and hydrogen contained in the chlorinated hydrocarbon by-products into useful HCl and useful $CO_2$.

b) No stream would be produced that contained more than three (3%) by weight HCl in water. If a stream is produced having three (3%) percent or more by weight of HCl in water, the process as defined in the RCRA regulations is classified as halogen acid furnace and all materials so processed is subject to a hazardous waste tax. With no acid produced containing greater than three (>3%) percent HCl in water, the modified VCR process unit can not be classified as a halogen acid furnace.

c) There would be no vents to the atmosphere. With the absorbent beds removing water and any possible contaminants from the $CO_2$ product and those contaminants ultimately being recycled back into the VCR reactor, there is zero discharge to the environment of such things as dioxin. The outstanding thing about the process is that what is now considered very hazardous chlorinated hydrocarbon waste would be processed in a manner such that the environmental impact would be zero.

2. Modifications that can be made to conventional hazardous waste incinerators used for the destruction of materials classified by the EPA as very hazardous chlorinated hydrocarbon waste materials such that those materials would no longer be classified as such, because:

a) The materials would be used in total to produce feedstocks that would be further used to produce other marketable products. The production of water and a very miner amounts of salt is acceptable. The key is to convert essentially all the carbon, chloride and hydrogen contained in the chlorinated hydrocarbon by-products into useful HCl and useful $CO_2$.

b) No stream would be produced that contained more than three (3%) percent by weight HCl in water. If a stream is produced having three (3%) percent or more by weight of HCl in water, the process as defined in the RCRA regulations is classified as halogen acid furnace and all materials so processed is subject to a hazardous waste tax. With no acid produced containing greater than three (>3%) percent HCl in water, the modified VCR process unit can not be classified as a halogen acid furnace.

c) There would be no vents to the atmosphere. With the absorbent beds removing water and any possible contaminants from the $CO_2$ product and those contaminants ultimately being recycled back into the VCR reactor, there is zero discharge to the environment of such things as dioxin. The outstanding thing about the process is that what is now considered very hazardous chlorinated hydrocarbon waste would be processed in a manner such that the environmental impact would be zero.

Any conventional hazardous waste incinerator modified in accordance with the principles of the present invention should become units highly suitable for processing materials containing such things as PCBs (polychlorinated bi-phenyls). Also, hazardous waste incinerators incorporating some of the modifications contained in this invention should be entirely suitable for destructing chemicals manufactured for chemical warfare. Things such as N-mustard compounds and S-mustard compounds could be totally and safely destroyed by employing the absorbent bed technique that is incorporated herewith into the list of suggested modifications for conventional hazardous waste incinerators. Right now, there is a desperate need for a reliable and satisfactory method that the United States Department of Defense can use to destruct a huge quantity of unneeded and unwanted N-mustard and S-mustard.

Additionally, as will become clear from the following detailed description, other highly innovative, unobvious advances and improvements are also disclosed as part of the present invention.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers, and wherein.

DESCRIPTION OF THE PREFERRED, EXEMPLARY EMBODIMENTS

Figure 1:
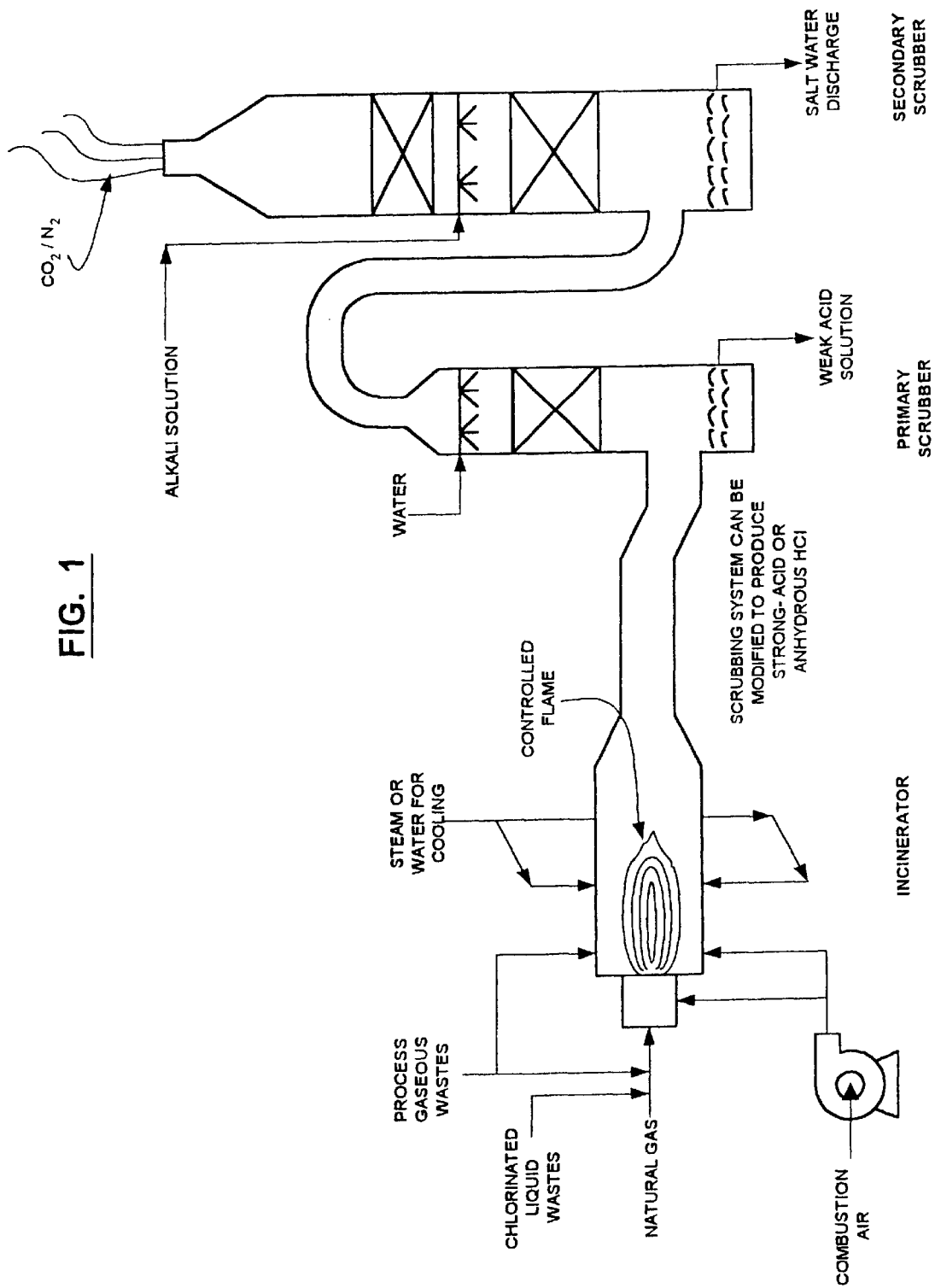
FIG. 1 is a schematic, generalized view of a typical, prior art chlorinated hydrocarbon waste incinerator system.

FIG. 1: The typical chlorinated hydrocarbon waste incinerator system is shown. The system is comprised of a central, high-temperature incinerator into which natural gas, chlorinated liquid wastes and process gaseous wastes are injected, along with combustion air. The controlled natural gas flame burns within the incinerator. There is a port adjacent to this flame wherein steam or water can be injected to cool the reaction. A primary scrubber is attached downstream of the incinerator, wherein hydrogen chloride is dissolved in water to produce a weak acid solution. A secondary scrubber containing an alkali solution is attached downstream of the primary scrubber in order to neutralize any HCl or chlorine still contained in the vent gas. The remaining $CO_2/N_2$ gas is vented from this secondary scrubber.

Figure 2:
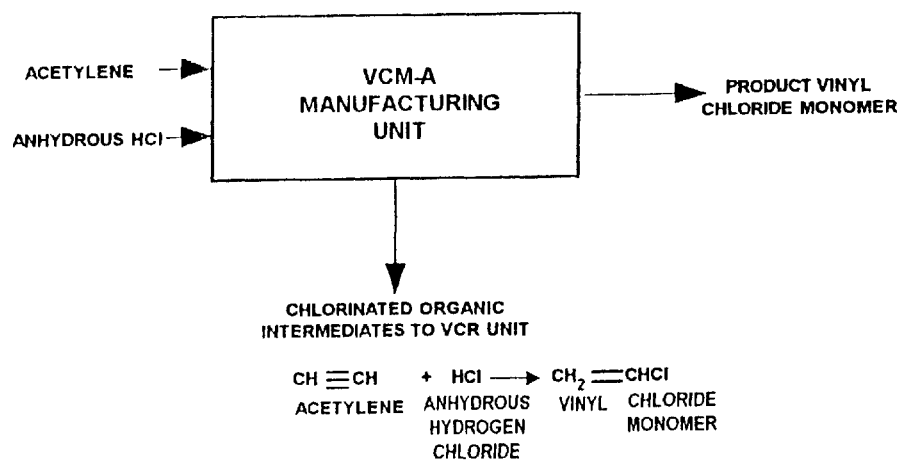
FIG. 2 is a schematic, flow chart view of the exemplary reaction taking place in an exemplary, prior art, vinyl chloride monomer-acetylene (VCM-A) manufacturing unit.

FIG. 2: The reaction taking place in a vinyl chloride monomer-acetylene (VCM-A) manufacturing unit is depicted. In this unit, acetylene is reacted with anhydrous HCl to produce vinyl chloride monomer. Chlorinated organic intermediates are shown as a by-product of this reaction. They may be used in a valorization of chlorinated residuals (VCR) process unit. The chemical equation showing the reaction of acetylene with HCl is also depicted.

Figure 3:
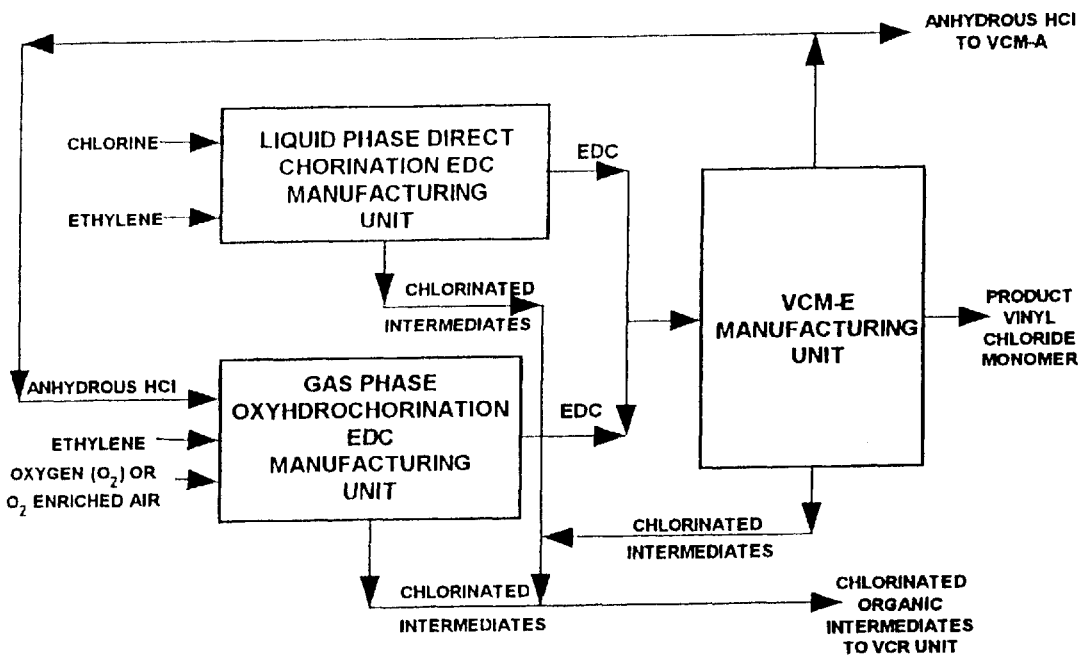
FIG. 3 is a schematic, flow chart view of the exemplary reaction taking place in an exemplary, prior art, vinyl chloride monomer-ethylene (VCM-E) system.

FIG. 3: The reaction taking place in a vinyl chloride monomer-ethylene (VCM-E) system is depicted. In one unit, chlorine and ethylene are reacted to produce ethylene dichloride (EDC) in a liquid phase direct chlorination technique. Chlorinated organic intermediates are by products of this reaction and may be fed into a VCR process unit. In another unit, anhydrous HCl is reacted with ethylene and $O_2$ to produce EDC in a gas phase oxyhydrochlorination technique. The EDC manufactured in the liquid and gas phase units is fed into the VCM-E manufacturing unit to produce the vinyl chloride monomer product. Chlorinated organic intermediates are generated in each unit, and may be fed into a VCR process unit. The basic chemical equation for the VCM-E process is also shown.

Figure 4:
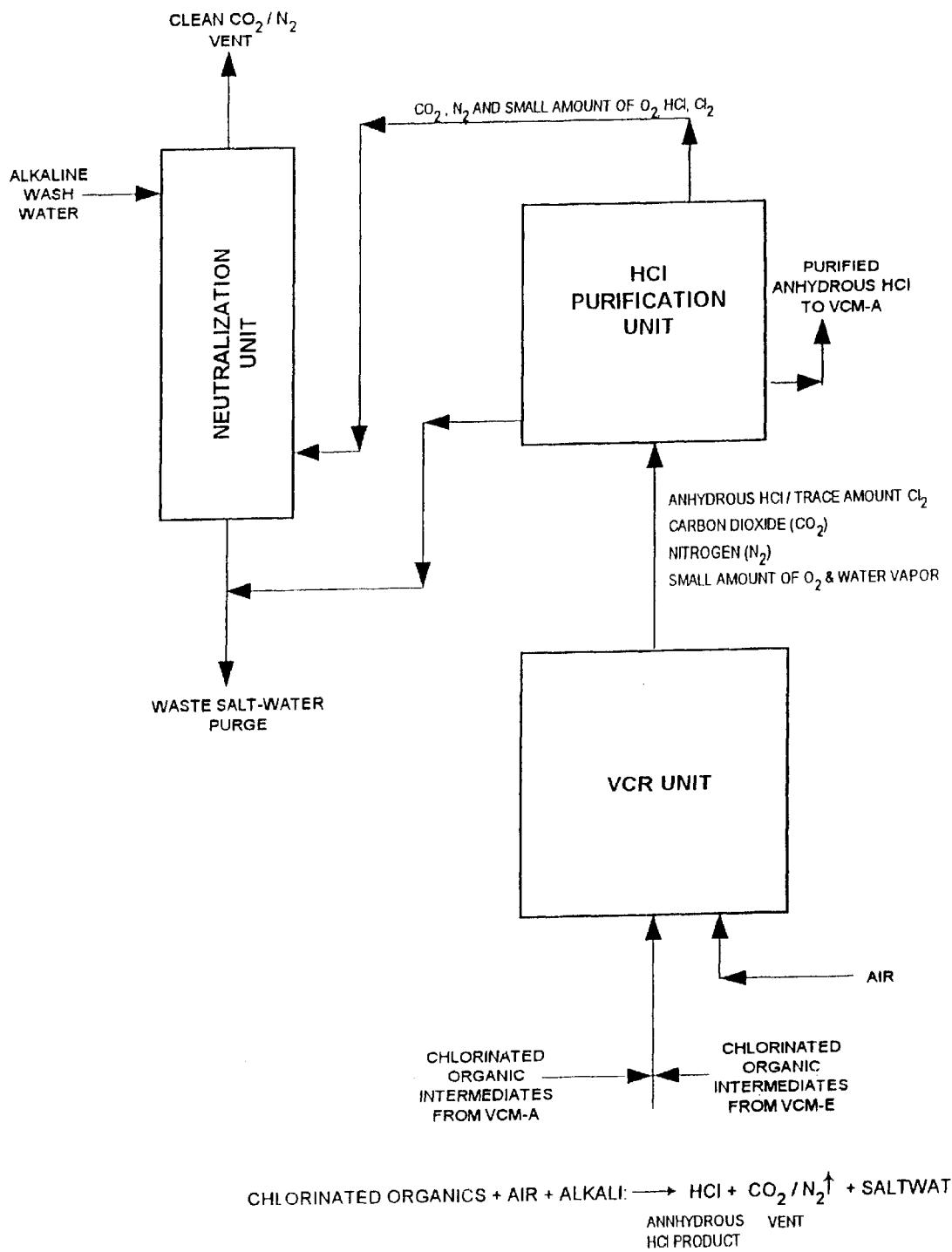
FIG. 4 is a schematic, flow chart view of the exemplary reactions taking place in a typical, prior art, air-fed valorization of chlorinated residuals (VCR) process unit.

FIG. 4: The reactions taking place in a typical air-fed valorization of chlorinated residuals (VCR) process unit are depicted. In this unit, chlorinated organic intermediates (i.e. chlorinated hydrocarbon by-products of the VCM-A and VCM-E processes) are fed with air into the VCR unit, where the chlorinated molecules are oxidized, thus yielding anhydrous HCl, trace amounts of $Cl_2$, carbon dioxide, nitrogen, and small amounts of oxygen and water vapor. This yield is passed into an HCl purification unit, from which purified anhydrous HCl is removed. Some salt water leaves this unit, while remaining vent gases are passed through a neutralization unit. In the neutralization unit, alkaline wash water neutralizes any remaining HCl and chlorine in the vent gas, turning it into waste salt water. The remaining, "clean" carbon dioxide/nitrogen gas mixture is vented from this unit. The basic chemical equation for this process is also shown.

Figure 5:
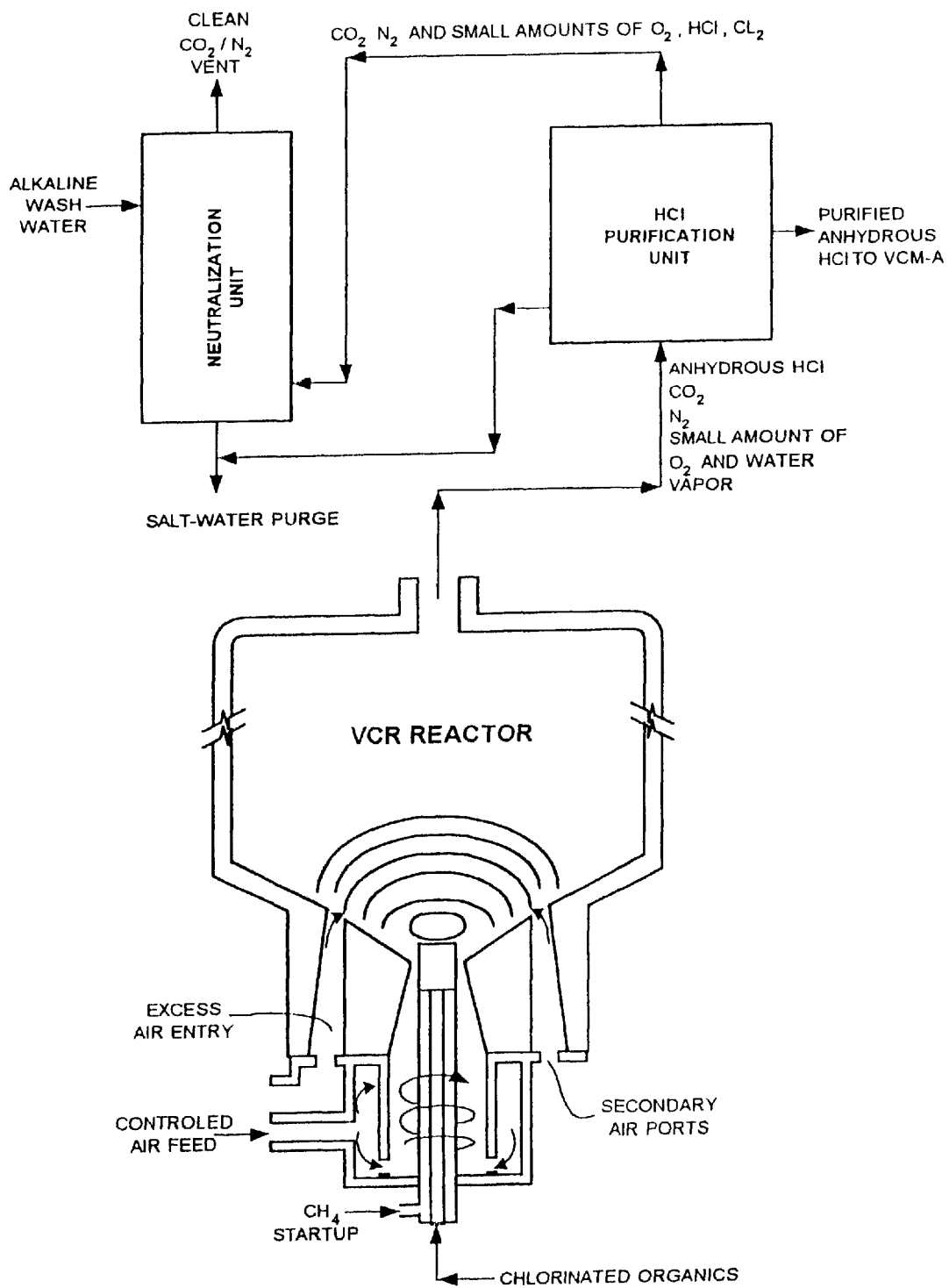
FIG. 5 is a schematic, generalized flow chart view of the exemplary feed mechanisms for an exemplary, prior art, air-fed valorization of the chlorinated residuals (VCR) process unit.

FIG. 5: The feed mechanisms for an air-fed valorization of chlorinated residuals (VCR) process unit is depicted. The unit consists primarily of a reactor, into which vaporized chlorinated organics are injected into a mixing device with a controlled feed of high velocity, high temperature air. Natural gas ($CH_4$) is used only during start-up of the unit. From the mixing device, the high-temperature organic intermediate/air mixture enters the reactor itself, where oxidation of the chlorinated compounds takes place. Secondary air ports, whence additional diluent air is drawn into the reactor, are also depicted. The anhydrous HCl, $CO_2$, $N_2$, $O_2$, and water vapor exits the reactor, passing through the HCl purification unit, and neutralization unit described in FIG. 4.

Figure 6:
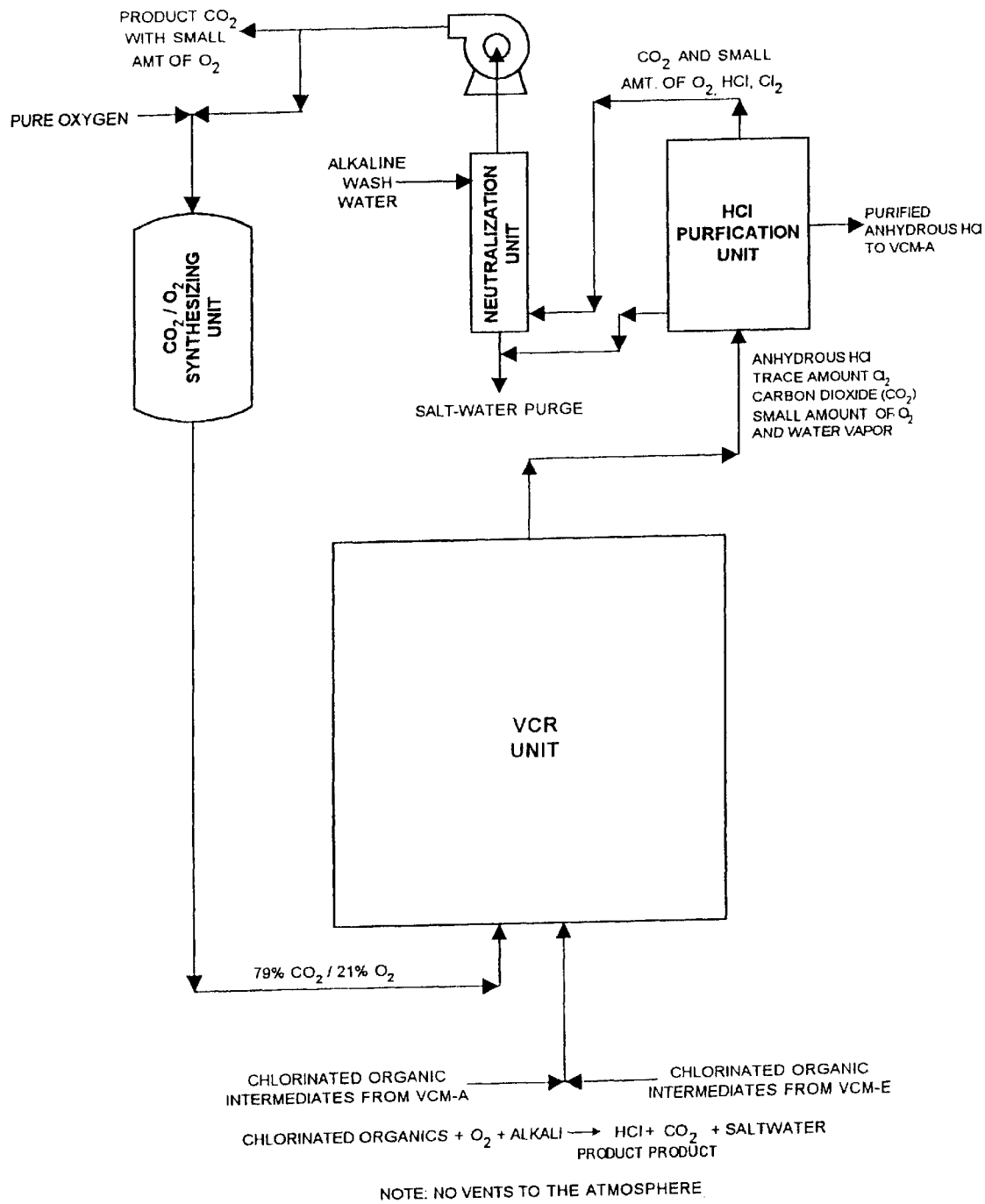
FIG. 6 is a schematic, generalized flow chart view of the exemplary reactions taking place in a VCR process unit modified for a synthesized $CO_2/O_2$ feed in accordance with the principles of the present invention.

FIG. 6: The reactions taking place in a VCR process unit modified for a synthesized $CO_2/O_2$ feed are depicted. In this modified system, a synthesized mixture comprised of approximately seventy-nine (79%) percent $CO_2$ and twenty-one (21%) percent $O_2$ is mixed with chlorinated organic intermediates and then injected into the VCR reactor. The resulting anhydrous HCl, $CO_2$, $O_2$, and water vapor product is passed into the HCl purification unit, where anhydrous HCl is removed. Some salt water exits this purification unit. The remaining $CO_2$ gas, containing trace amounts of HCl and chlorine, is passed through a neutralization unit, where an alkaline wash is used to neutralize any remaining HCl and chlorine from the $CO_2$, converting them into salt water. The nearly pure $CO_2$, is then collected as it exits the neutralization unit, where it may be used as $CO_2$ product, or mixed with pure $O_2$ in a synthesizing unit. The mixture from the synthesizing unit is then fed back into the VCR reactor.

Figure 7:
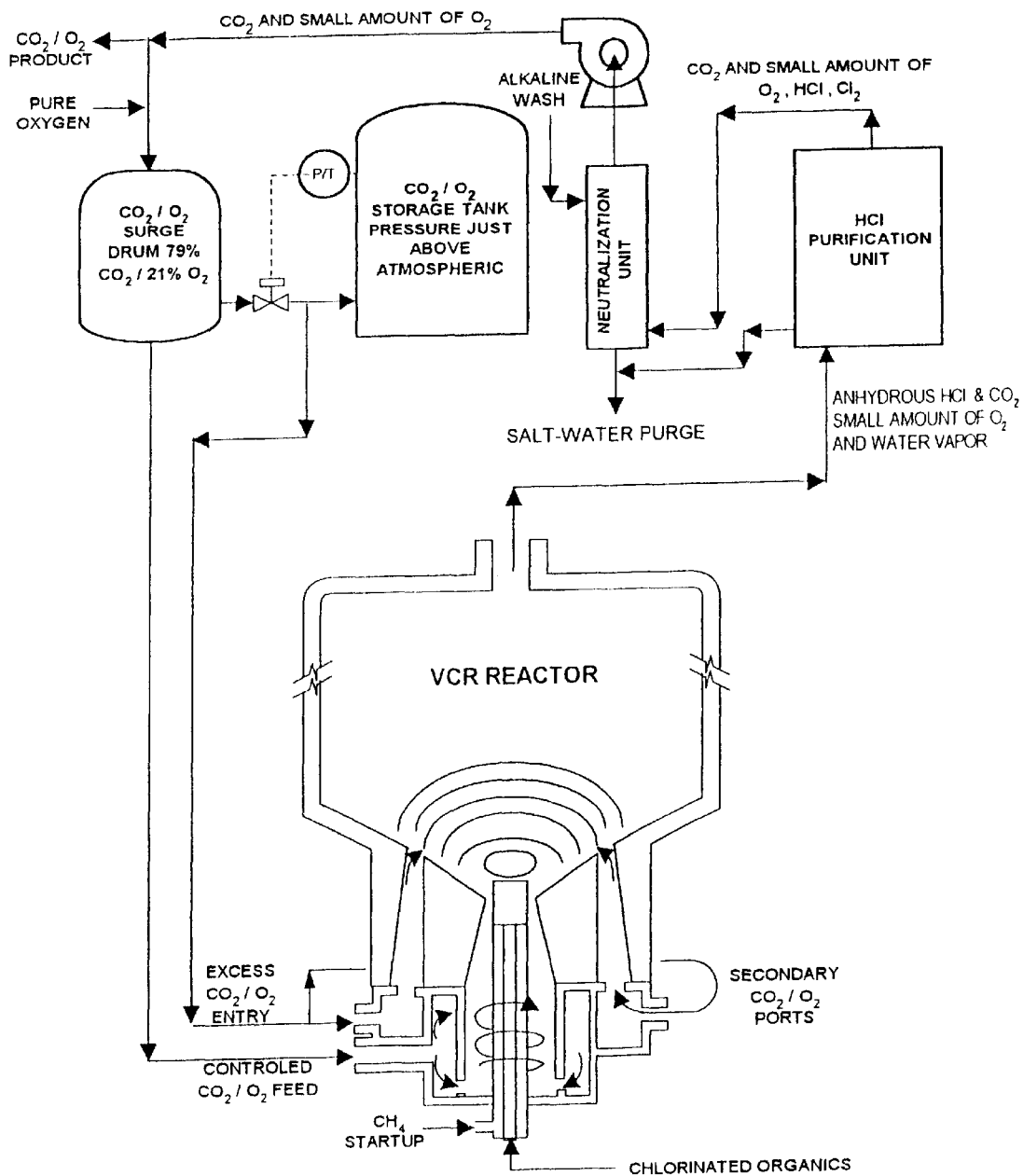
FIG. 7 is a schematic, generalized flow chart view of the exemplary feed mechanism for a $CO_2/O_2$-fed VCR unit, such as that shown in FIG. 6.

FIG. 7: The feed mechanism for a $CO_2/O_2$-fed VCR unit is depicted. The unit includes primarily a reactor into which chlorinated organic intermediates are injected, along with a high-velocity, high-temperature controlled feed of $CO_2/O_2$. These components are mixed and injected into the reactor unit, where oxidation of the chlorinated compounds takes place. The synthesized $CO_2/O_2$ mixture is further drawn into secondary ports to act as a diluent to the reaction. Note that no air is either fed into, nor drawn into this modified system. The anhydrous HCl, $CO_2$, $O_2$, and water vapor mixture is passed into the HCl purification unit, where nearly pure anhydrous HCl is removed. Some salt water exits this unit. $CO_2$, and small amounts of $O_2$, HCl and $Cl_2$ exit the purification unit and pass through the neutralization unit, where an alkali wash neutralizes any HCl and chlorine molecules, turning them into salt water. Then, the nearly pure $CO_2$ product is collected from the neutralization unit, where it may be used in other processes, or blended with $O_2$ in a high pressure surge drum, whence the synthesized blend may be drawn for the controlled feed. Additional synthesized $CO_2/O_2$ mixture is drawn from the surge drum and stored just above atmospheric pressure in a tank for feed into the secondary (diluent) $CO_2/O_2$ ports in the reactor.

Figure 8:
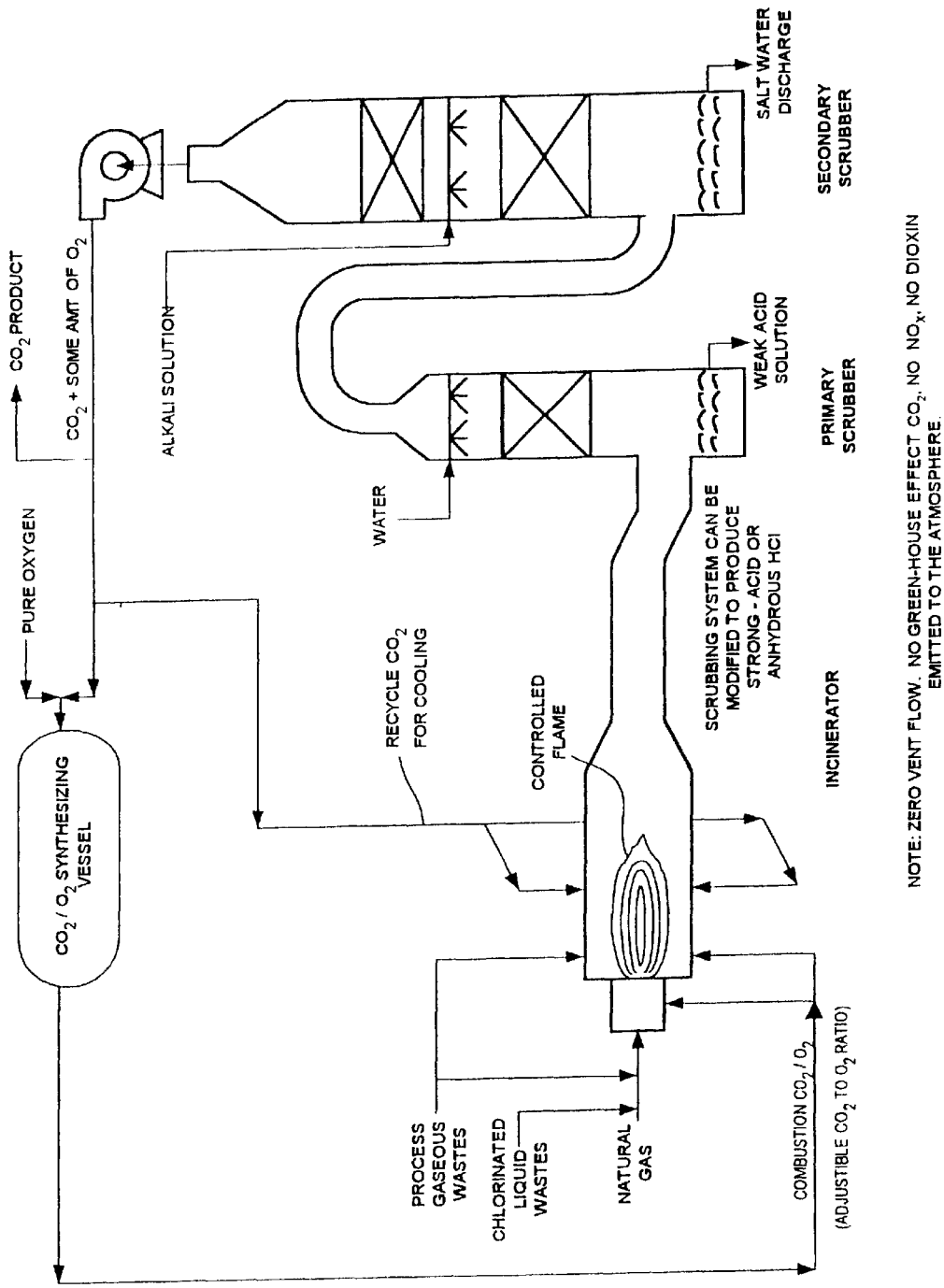
FIG. 8 is a schematic, generalized flow chart view of the exemplary chlorinated hydrocarbon waste incineration system modified for a synthesized $CO_2/O_2$ feed in accordance with principles of the present invention.

FIG. 8: The chlorinated hydrocarbon waste incineration system modified for a synthesized $CO_2/O_2$ feed is depicted. In this system, chlorinated liquid wastes and process gaseous wastes are injected along with the natural gas fuel and the $CO_2/O_2$ combustion mixture into the incinerator. Chlorinated molecules are broken down (oxidized) in a controlled flame within the incinerator. Recycled $CO_2$ is injected adjacent to this controlled flame for cooling purposes. Downstream of the incinerator, a primary scrubber removes most hydrogen chloride from the by-product blend exiting the incinerator, yielding an acid solution that may be purified for further use or neutralized for disposal. A secondary scrubber downstream of the primary scrubber removes an remaining chlorine molecules from the vent gas, yielding salt water and a nearly pure $CO_2$ vent product. This vent product may then be mixed with pure $O_2$ in a synthesizing vessel and re-injected into the incinerator.

Figure 9:
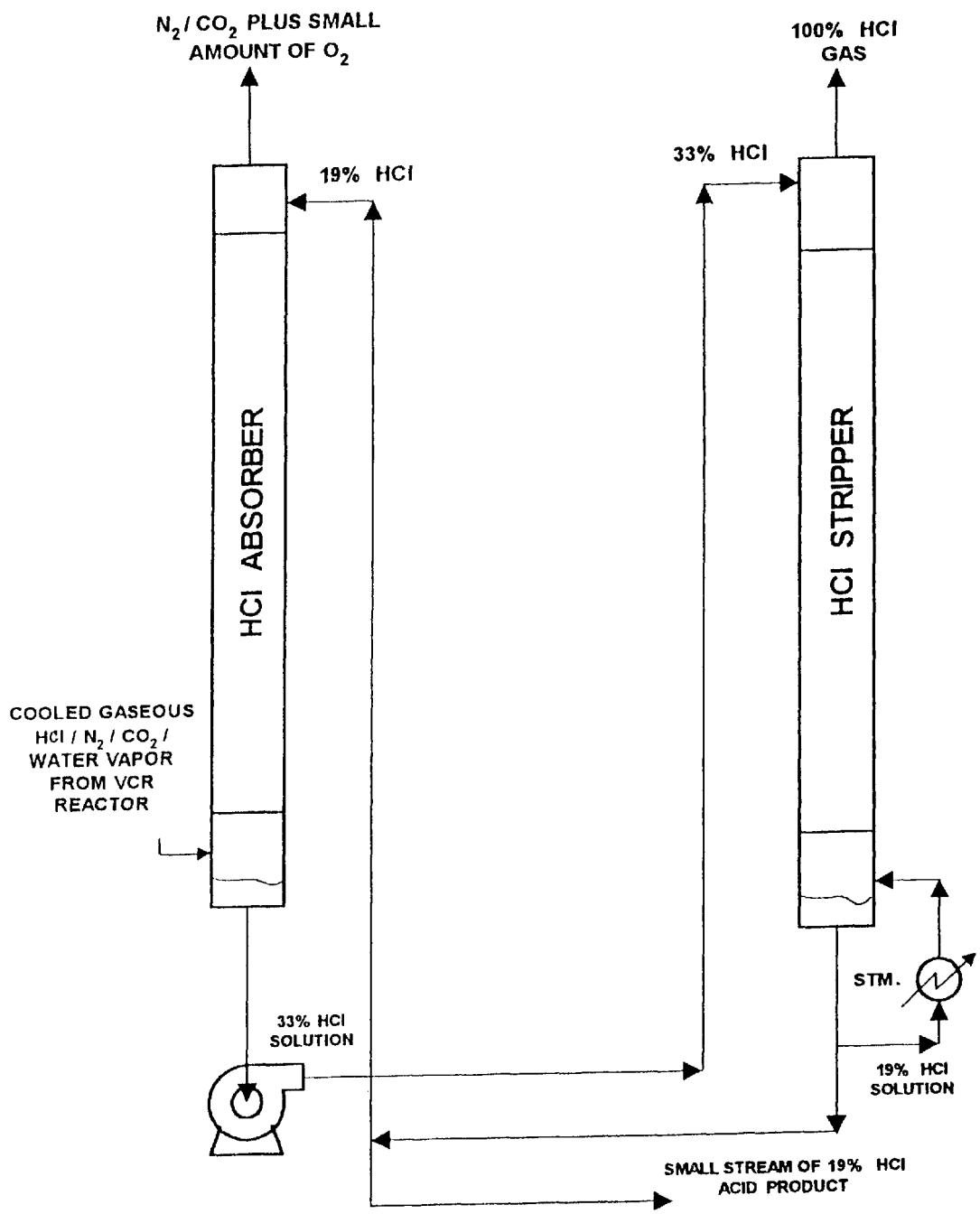
FIG. 9 is a simplified flow diagram of an exemplary, prior art HCl purification system as found in the VCR process unit.

FIG. 9: The simplified flow diagram of an HCl purification system as found in the VCR process unit is depicted. In this system, a gaseous mixture comprised of mostly HCl, $CO_2$ and water vapor is passed into the HCl Absorber from the VCR reactor. This absorber removes nearly all of the HCl from the gaseous mixture, which then exits the absorber in solution with water at approximately thirty-three (33%) percent by weight HCl. $CO_2$ containing a small amount of $O_2$ is vented from this absorber. The thirty-three (33%) percent by weight HCl acid stream is pumped into an HCl stripper where HCl is separated from the solution, yielding one-hundred (100%) percent anhydrous HCl gas. An approximately nineteen (19%) percent by weight HCl acid solution is withdrawn from the bottom of the HCl stripper with most of the stream being recycled back to the HCl absorber. A small portion of the nineteen (19%) percent HCl recycle stream is purged from the system to remove excess water generated in the VCR reactor. This diagram is also applicable to the HCl purification unit attached to a chlorinated hydrocarbon waste incinerator.

Figure 10:
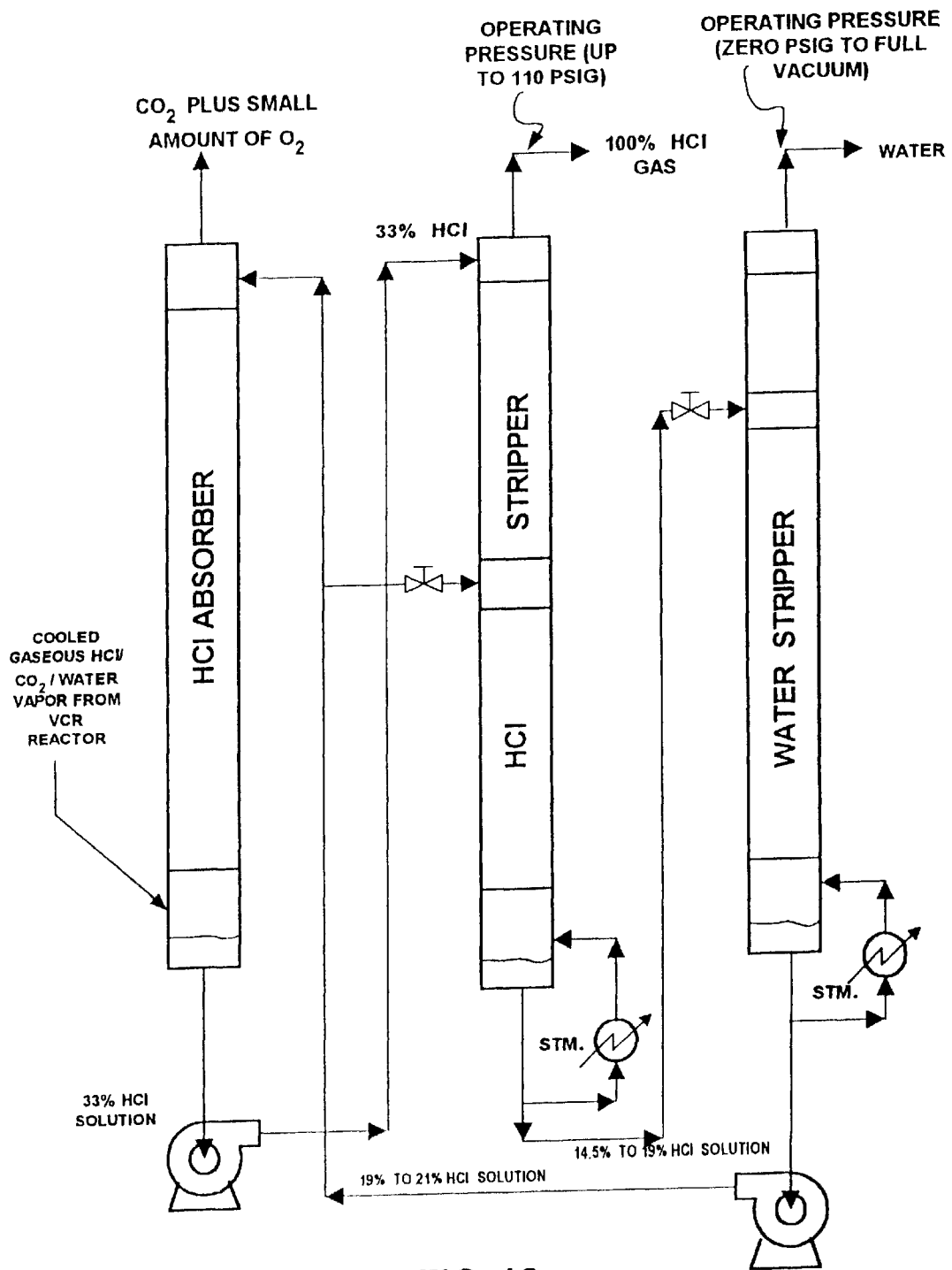
FIG. 10 is a simplified flow diagram of the exemplary HCl purification system modified in accordance with the principles of the present invention.

FIG. 10: The simplified flow diagram of a modified HCl purification system as found in the VCR process unit is depicted. In this system, a gaseous mixture comprised of mostly HCl, $CO_2$ and water vapor is passed into the HCl Absorber from the VCR reactor. This absorber removes nearly all of the HCl from the gaseous mixture, which then exits the absorber in solution with water at approximately thirty-three (33%) percent by weight HCl. $CO_2$ containing a small amount of $O_2$ is vented from the Absorber. The thirty-three (33%) percent by weight HCl acid stream is pumped into an HCl stripper maintained under high pressure where HCl is separated from the solution, yielding one-hundred (100%) percent anhydrous HCl gas. High pressure operation of the HCl Stripper permits the production of an underflow stream containing less than nineteen (19%) percent HCl, the normal being approximately eighteen (18%) percent by weight HCl. The eighteen (18%) percent HCl stream is then fed into the which is operated at zero PSIG or vacuum pressure. Essentially pure water is distilled overhead from the water stripping column, thus producing an underflow stream of twenty to twenty-one (20% to 21%) percent by weight HCl in water. The entire underflow from the water stripping column is recycled back to the HCl absorber.

Figure 11:
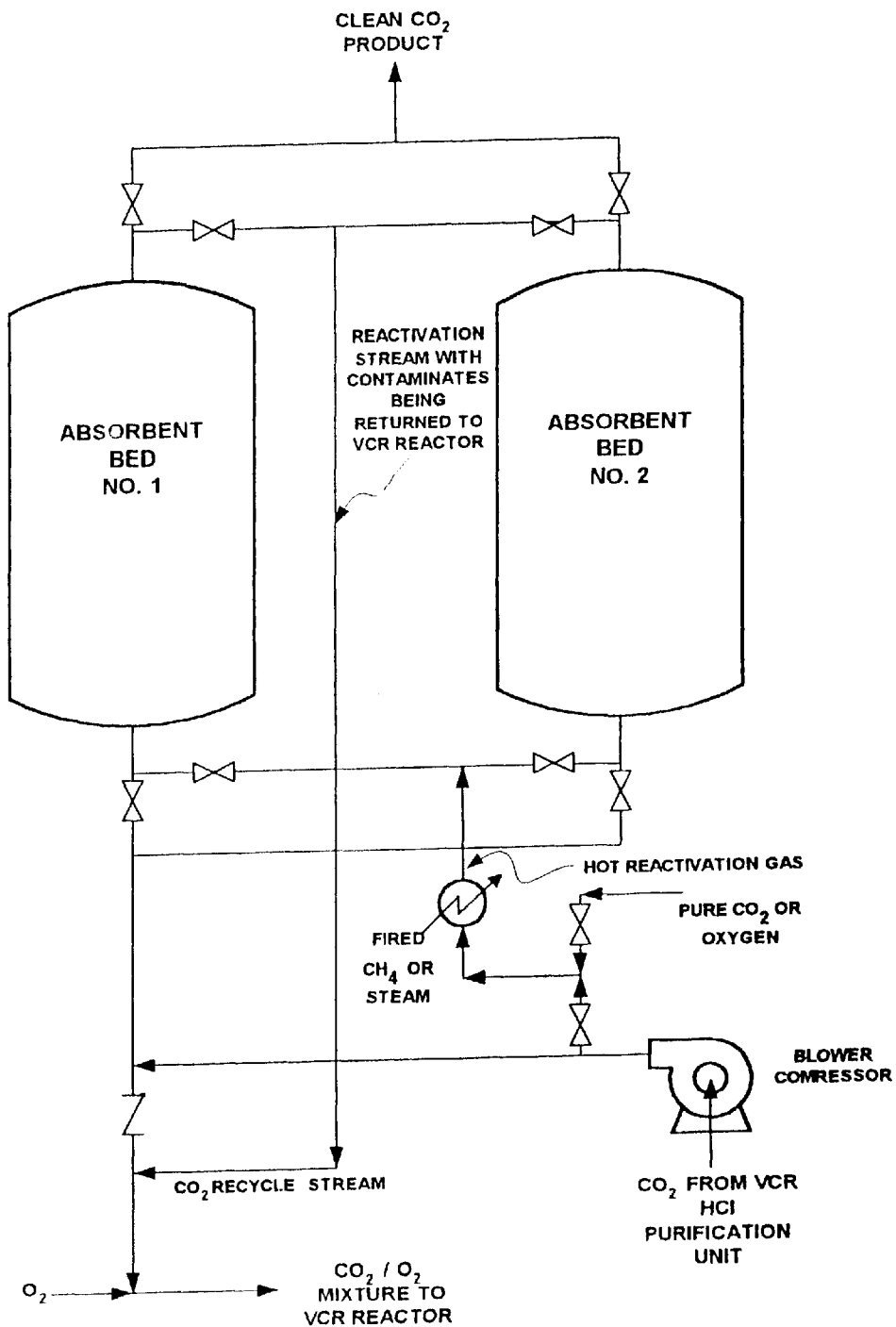
FIG. 11 is a schematic of exemplary absorbent beds for removing contaminants from the carbon dioxide ($CO_2$) product generated in the VCR process unit or a chlorinated hydrocarbon waste incinerator.

FIG. 11: The schematic of absorbent beds for removing contaminants from the $CO_2$ product generated in a VCR process unit or a chlorinated hydrocarbon waste incinerator is depicted. In this system, $CO_2$ from the HCl purification unit is directed into an Absorbent Bed No. 1, where contaminants such as dioxin are absorbed from the $CO_2$. The clean $CO_2$ product is exited from the downstream end of the absorbent bed. The clean $CO_2$ may then be used for other operations requiring $CO_2$. An Absorbent Bed No. 2 is installed in parallel with Absorbent Bed No. 1. It is used to clean the $CO_2$ product in like manner while the first Absorbent Bed is being reactivated (i.e. while trapped contaminants are removed from the bed through the introduction of a hot $CO_2$ reactivation gas heated by high pressure steam). Note that $CO_2$ generated within the system is employed as the reactivation gas, thereby keeping all products within the system. A reactivation stream bearing contaminants is routed from the reactivated Absorbent Bed back into the VCR reactor, where contaminants are destroyed. A system of valves within the system of Absorbent Beds directs the proper flow of $CO_2$ product or reactivation materials. The $CO_2$ feed stream entering an absorbent bed will contain a low level of water. The bottom portion of each absorbent bed preferably includes a desiccant material for removing water from the $CO_2$, thus producing a dry, purified $CO_2$ exit stream.

Figure 12:
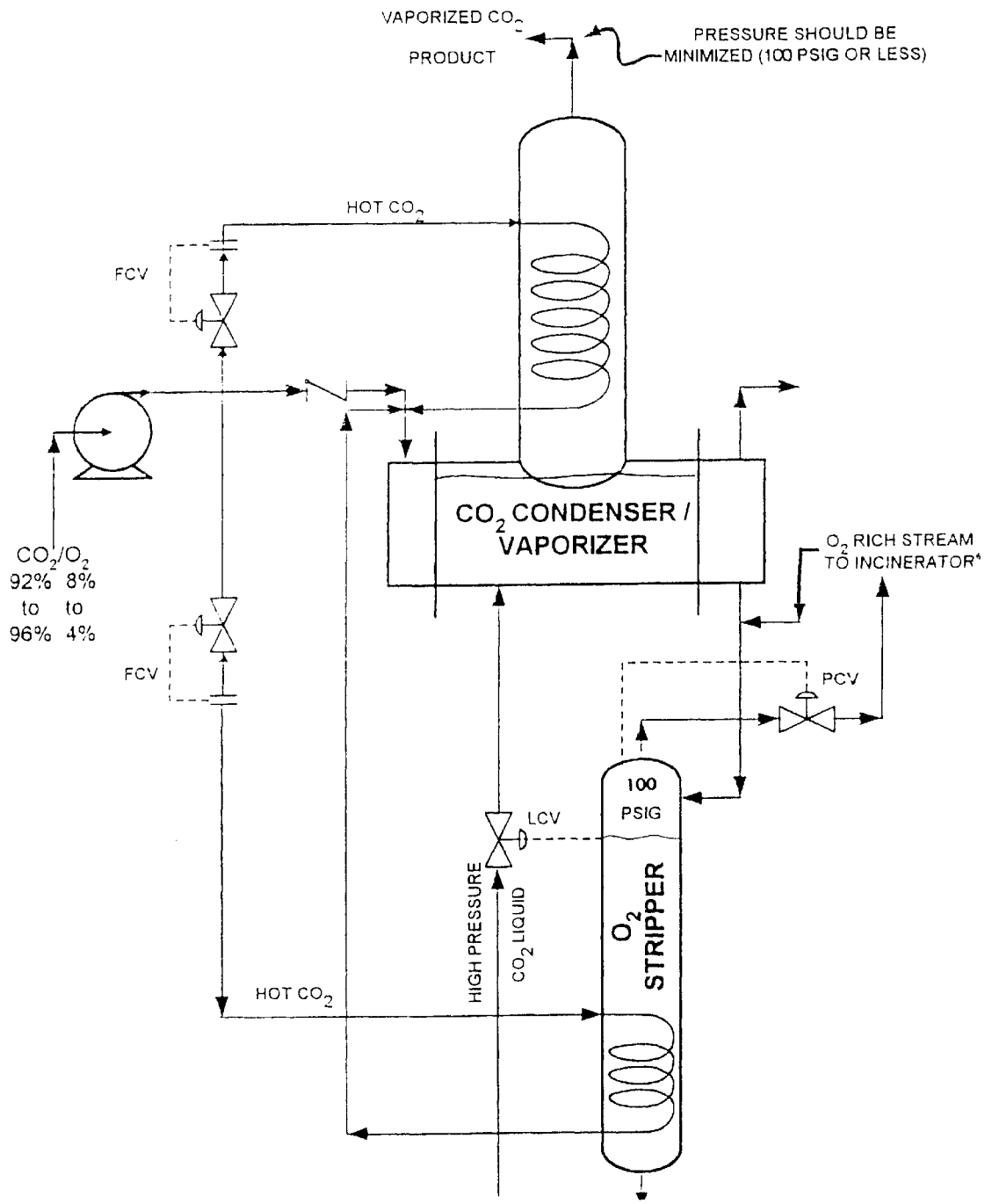
FIG. 12 is a simplified flow diagram and schematic for an exemplary, optional, preferred process and system for separating out undesired oxygen ($O_2$) from the product carbon dioxide ($CO_2$) stream for optional use in conjunction with the HCl purification system of the invention.

FIG. 12: The simplified flow scheme of a process for separating $O_2$ from $CO_2$ is depicted. The scheme comprises a unit whereby the $CO_2$, which contains some amount of $O_2$ exiting the absorbent beds, is compressed to a relatively high pressure and then passed through, for example, the tubes of a shell-and-tube, heat exchanger which has on the shell side of the exchanger liquid $CO_2$ boiling at a lower pressure. The relatively low temperature boiling $CO_2$ on the shell side of the heat exchanger condenses the high pressure $CO_2$ passing through the tubes thus producing a stream containing liquid $CO_2$ and $O_2$ in solution with the liquid $CO_2$ and free $O_2$ gas. This stream is fed into a column where, for example, hot compressor discharge gas is used to apply heat to the liquid $CO_2$ at the bottom of the column thus driving the dissolved $O_2$ up and out the top of the column. The $O_2$ rich stream exiting the top of the oxygen stripping column can be recycled back into the high temperature reactor. The vaporized oxygen free $CO_2$ stream as it exits the shell side of the heat exchanger is heated with hot compressor discharge gas thus producing heated high quality pipeline $CO_2$ product. Since this $CO_2$ product stream contains essentially no $O_2$, it can be used as a reactivation gas for absorbent beds utilizing activated carbon as the absorbent material.

Figure 13:
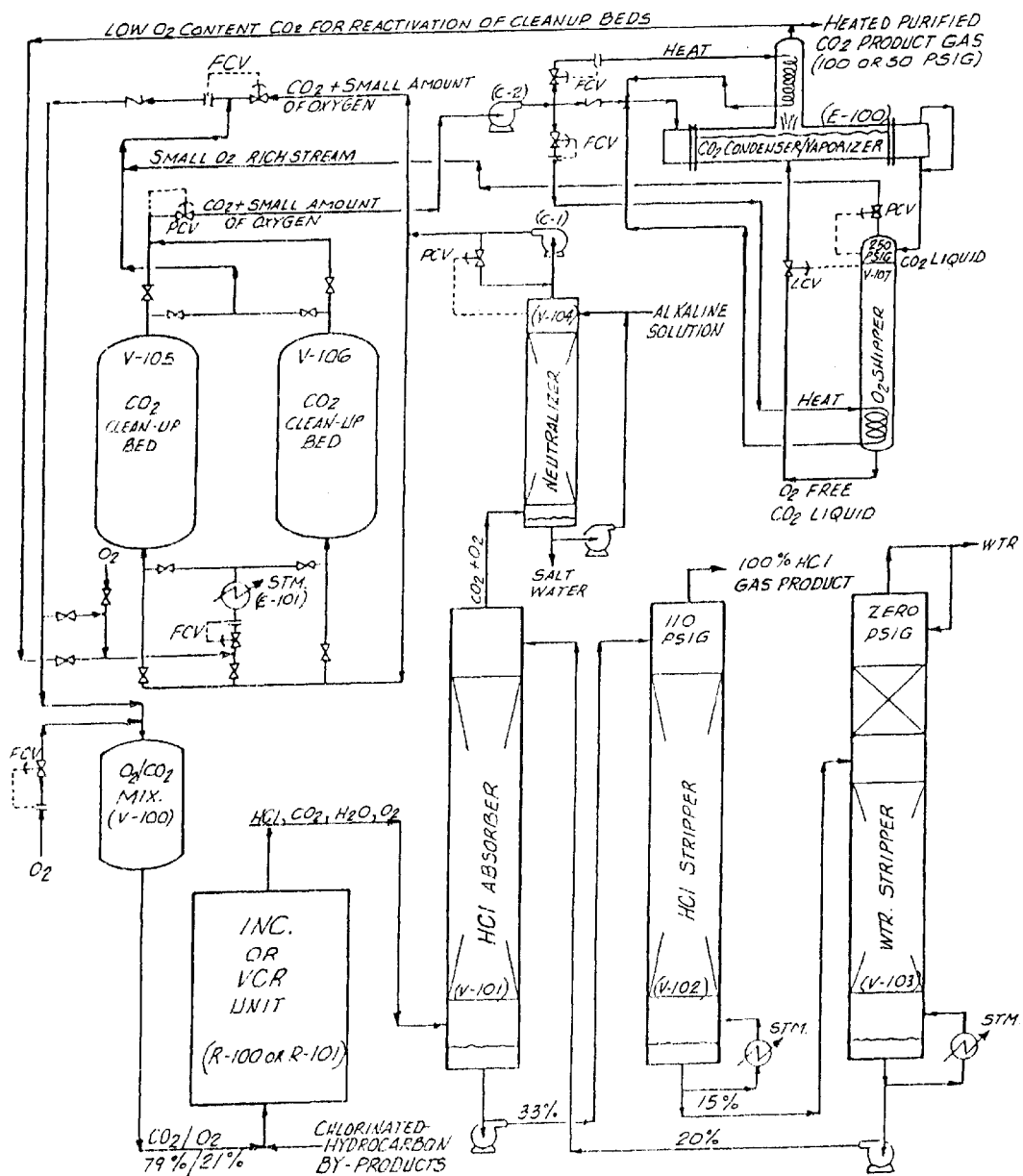
FIG. 13 is a simplified flow diagram and schematic of the exemplary integrated process for producing, from chlorinated hydrocarbon by-products, high purity HCl gaseous product and high purity $CO_2$ gaseous product with zero discharge of pollutants to the environment, including no discharge of dioxins, green-house gases or $NO_x$ gases.

FIG. 13: The simplified, integrated process, flow scheme for producing, from chlorinated hydrocarbon by-product, high purity gaseous HCl product and gaseous $CO_2$ product is depicted. The process discharges no environmentally harmful materials to the environment and completely meets the objectives of RCRA. The integrated process involves manufacturing a synthetic mixture of $CO_2$ and $O_2$ in vessel V-100. This synthetic mixture of $CO_2/O_2$ is properly mixed with the chlorinated hydrocarbon by-products and fed into a high temperature reactor(s), for example, an incinerator R-100 or a VCR unit R-101.

Exiting the high temperature reactor R-100/R-101 is a gas stream consisting of HCl, $CO_2$, $H_2O$ vapor and $O_2$. After cooling (cooling step not shown), this stream is fed into the bottom of the HCl absorber V-101 where the HCl is absorbed into weak acid [approximately twenty (20%) percent in strength] which is fed into the top of V-101. Strong acid [approximately thirty-three (33%) percent] is pumped from the bottom of absorber V-101 and fed into the top of the high pressure HCl stripper V-102. Steam heat is applied to the bottom of stripper V-102, thus resulting in the overhead stripping of approximately fifty-four to fifty-five (54–55%) of the HCl fed into stripper V-102. Normally, the high pressure HCl gas produced in stripper V-102 will be used for producing ethylene dichloride in oxyhydrochlorination reactors and for producing vinyl chloride monomer in VCM-A reactors.

The underflow from the stripper V-102, approximately fifteen (15%) percent in strength, is fed into the top of the water stripper V-103, where water is distilled overhead by applying steam heat to the bottom of the column. Enough water is distilled overhead in the stripper V-103 to produce an under-flow stream approximately twenty (20%) percent in strength. This twenty (20%) percent stream is recycled back into the top of absorber V-101. (Within the HCl absorption and stripping system, heat removal, which is not shown, is required.)

Carbon dioxide exiting absorber V-101 and containing four to ten (4–10%) percent $O_2$ and trace quantities of HCl and chlorine is fed into the bottom of the Neutralizer V-104, where the gas is scrubbed with an alkaline solution to neutralize the trace quantities of HCl and chlorine. $CO_2$ with some amount of $O_2$ present exits the top of neutralizer V-104 and is fed into compressor C-1, where the pressure is raised to a level sufficient for recycling $CO_2$ into vessel V-100 and for passing the stream through the $CO_2$ clean-up beds V-105 and V-106.

Un-purified $CO_2$ containing some $O_2$ is fed through clean-up bed V-105 while V-106 is being reactivated or visa-versa. Clean-up beds V-105 and V-106 are charged with activated carbon or some other material capable of removing trace contaminants, such as dioxin, from the $CO_2$ stream. The bottom portion of each $CO_2$ clean-up bed likely will need to be charged with a desiccant material capable of removing the low levels of water that will be present in the gas stream entering the beds. Upon exiting the active clean-up bed V-105/V-106, depending on which clean-up bed is in service, purified dry $CO_2$ containing some $O_2$ is fed into compressor C-2, where the pressure is elevated to approximately one hundred (100 PSIG) pounds per square inch and then routed through the tube side of the $CO_2$ condenser/vaporizer E-100. As the high pressure gas passes through the tubes, the $CO_2$ condenses taking some $O_2$ into solution. Condensed $CO_2$, $O_2$ in solution and gaseous $O_2$ are passed into the $O_2$ stripper V-107. The bottom of V-107 is heated with hot gas exiting compressor C-2, thus driving the $O_2$ dissolved in the liquid $CO_2$ up and out the top of V-107. The $O_2$ rich stream exiting the top of stripper V-107 is recycled back into vessel V-100. Oxygen free $CO_2$ is withdrawn from the bottom of V-107, where it is routed into the shell side of heat exchanger E-101. The shell side of heat exchanger E-101 is maintained at a pressure well below the discharge pressure of compressor C-2, thus permitting $CO_2$ to vaporize in the shell of condenser/vaporizer E-100 at a temperature low enough to condense the $CO_2$ flowing through the tubes. As the purified vaporized $CO_2$ exits the shell of condenser/vaporizer E-100, it is heated with the hot gas discharged from compressor C-2 and then is marketed as high purity $CO_2$ pipeline product. A portion of the high purity $CO_2$ product is routed through the heat exchanger E-101, where it is heated to a sufficient temperature to reactivate either lean-up bed V-105 or V-106, which ever bed is being reactivated. As the hot $CO_2$ passes through the bed being reactivated, dioxin and other such compounds are stripped from the beds and routed back through the high temperature reactor where they are destroyed. Also, the water captured by the water removing desiccant within the bed is stripped from the bed and routed back into the reactor.

FIG. 13 thus depicts a method for modifying conventional hazardous waste incinerators units or VCR units for producing high purity HCl gas and high purity $CO_2$ gas with zero discharge of any harmful materials to the environment. It also depicts a methods for building and operating new incinerator units and new VCR units that will produce from chlorinated by-products high purity HCl and high purity $CO_2$ with zero discharge of any harmful material to the environment.

It is noted that the embodiments described herein in detail for exemplary purposes are of course subject to many different variations in structure, design, application, chemical components and methodology. Because many varying and different embodiments may be made within the scope of the inventive concept(s) herein taught, and, because many modifications may be made in the embodiments herein detailed in accordance with the descriptive requirements of the law, it is to be understood that the details herein are to be interpreted as illustrative and not in a limiting sense.

What is claimed is:

1. A closed-loop process for incinerating chlorinated hydrocarbon-containing material with substantially zero emission of air borne pollutants, which chlorinated hydrocarbon-containing material, during incineration, is capable of producing a gaseous effluent containing hydrogen chloride and pollutants selected from the group consisting of acid gases and dioxins, which process comprises:

a) incineratin gsaid chlorinated hydrocarbon-containing material in an incinerator, thereby producing a gaseous effluent product containing water vapor, hydrogen chloride, and one or more other gaseous components selected from the group consisting of carbon dioxide, oxygen, nitrogen, and chlorinated pollutants;

b) passing said gaseous effluent through a hydrogen chloride absorption zone wherein it is contacted with the aqueous hydrogen chloride stream generated in step e) below wherein a substantial portion of the hydrogen chloride from the gaseous effluent is absorbed into said aqueous hydrogen chloride stream thereby resulting in a hydrogen chloride aqueous product stream having at least a 31% concentration of hydrogen chloride and a gaseous effluent substantially free of hydrogen chloride;

c) passing said aqueous hydrogen chloride product stream to a stripping zone which is operated at elevated pressure and wherein stream heat is used to strip chloride from said aqueous hydrogen chloride product stream thereby producing a substantially pure anhydrous hydrogen chloride gaseous stream and an aqueous hydrogen chloride stream having less than about 19% hydrogen chloride;

d) collecting and substantially pure anhydrous hydrogen chloride stream;

e) passing said aqueous hydrogen chloride stream containing less than about 19% hydrogen chloride to a water stripping zone operated at substantially atmospheric pressure wherein stream is used to strip water from said aqueous hydrogen chloride stream thereby stripping a portion of the water from said aqueous hydrogen stream so that its concentration of hydrogen chloride is greater than about 19.

f) passing said gaseous effluent which is substantially free of hydrogen chloride from step b) above through at least one sorption zone comprised of at least one bed of sorbent capable of sorbing at least a portion of said pollutants from said gaseous effluent;

g) collecting, or venting, the gaseous effluent containing reduced levels of pollutants;

h) reactivating said one or more sorbent beds with a reactivating gaseous stream capable of desorbing said pollutants from said sorbent beds; and i) passing said pollutant containing reactivting gaseous stream to said incinerator of step (a) above, wherein said pollutants are decomposed by combustion.

2. The process of claim 1 wherein said gaseous effluent exiting the hydrogen chloride absorption zone is passed through an acid neutralizing zone wherein said gaseous effluent is scrubbed with a aqueous alkaline solution to remove substantially all remaining acid components in said gaseous effluent.

3. The process of claim 1 wherein the gaseous effluent leaving said incinerator is cooled before being passed to said hydrogen chloride absorption zone.

4. The process of claim 1 wherein the gaseous effluent stream leaving said heat exchanger contains particulate matter which stream is passed to a particulate separation unit wherein at least a portion of said particulate matter is removed from said gaseous effluent stream.

5. The process of claim 1 wherein said incinerator is operated on a mixture of carbon dioxide and oxygen in the substantial absence of air.

6. The process of claim 5 wherein the ratio of carbon dioxide to oxygen is from about 90:25 to about 10:75.

7. The process of claim 1 wherein the sorbent beds are comprised of at least one sorbent selected from the group consisting of activated carbon, alumina, silica, and molecular sieves.

8. The process of claim 7 wherein said sorbent is an activated carbon.

9. The process of claim 1 wherein the reactivation reagent is carbon dioxide.

10. The process of claim 1 wherein said incinerator is a valorization of chlorinated residuals reactor having secondary ports wherein an oxygen rich mixture of carbon dioxide and oxygen is introduced into said secondary ports.

* * * * *